United States Patent
Mirea et al.

(10) Patent No.: US 8,513,930 B2
(45) Date of Patent: Aug. 20, 2013

(54) ACTIVE POWER SWITCH TOPOLOGY FOR SWITCHING REGULATORS

(75) Inventors: Iulian Mirea, Singapore (SG); Quynh Duong Truc Le, Singapore (SG); Hua Beng Chan, Singapore (SG)

(73) Assignee: Broadcom Corporation, Irvine, CA (US)

( * ) Notice: Subject to any disclaimer, the term of this patent is extended or adjusted under 35 U.S.C. 154(b) by 348 days.

(21) Appl. No.: 12/914,025

(22) Filed: Oct. 28, 2010

(65) Prior Publication Data
US 2011/0121805 A1    May 26, 2011

Related U.S. Application Data
(60) Provisional application No. 61/272,971, filed on Nov. 25, 2009.

(51) Int. Cl.
*G05F 1/40*    (2006.01)

(52) U.S. Cl.
USPC .......................................... 323/282; 323/271

(58) Field of Classification Search
USPC .................. 323/223, 225, 268, 271, 282, 285
See application file for complete search history.

(56) References Cited

U.S. PATENT DOCUMENTS

| | | | |
|---|---|---|---|
| 6,249,111 B1 * | 6/2001 | Nguyen | 323/282 |
| 7,990,124 B2 * | 8/2011 | Hu | 323/283 |
| 2009/0257257 A1 * | 10/2009 | Adragna et al. | 363/65 |

OTHER PUBLICATIONS

Ionaşcu, Cristian, "Design Aspects for Gate Driver of Power Switch," Infineon technologies Romania SCS, © 2007 IEEE, pp. 505-508.
Usami, Kimiyoshi et al., "Design and Implementation of Fine-Grain Power Gating with Ground Bounce Suppression,"2009 $22^{nd}$ International Conference on VLSI Design, © 2009 IEEE, pp. 381-386.

* cited by examiner

*Primary Examiner* — Matthew Nguyen
(74) *Attorney, Agent, or Firm* — Sterne, Kessler, Goldstein & Fox P.L.L.C.

(57) ABSTRACT

Embodiments of an active power switch topology for a switching regulator are provided herein. The embodiments of the active power switch topology use two or more active power switches in parallel instead of a single active power switch, as found in conventional implementations. The active power switches are controlled such that they turn-on and -off in a manner that reduces parasitic voltage spikes associated with conventional switching regulators, while not degrading efficiency or other parameters associated with the switching regulator. The active power switch topology can be beneficially used within many switching regulators (e.g., buck, boost, or buck-boost) and, in particular, within hard-switched switching regulators that include active power switches integrated on chip.

18 Claims, 6 Drawing Sheets

US 8,513,930 B2

ACTIVE POWER SWITCH TOPOLOGY FOR SWITCHING REGULATORS

CROSS REFERENCE TO RELATED APPLICATIONS

This application claims the benefit of U.S. Provisional Patent Application No. 61/272,971, filed Nov. 25, 2009, entitled "Active Power Switch Topology for Switching Regulators," which is incorporated herein by reference in its entirety.

FIELD OF THE INVENTION

This application relates generally to switching regulators and more particularly to active power switches for switching regulators.

BACKGROUND

Switching regulators are a common solution to provide a regulated output voltage from a varying input voltage. They are frequently implemented in battery powered electronic devices to regulate the battery output voltage which, when charged or discharged, can be greater than, less than, or substantially the same as the desired output voltage.

Conventional switching regulators generally have one or more power switches and an inductor-capacitor (LC) filter coupled between the unregulated input and the regulated output via the power switches. A control circuit selects the switching regulator configuration (i.e., the operating mode) by controlling positions of the power switches and the duration of time during which switch positions remain unchanged.

Depending on the switch configurations, the switching regulator can operate as a buck converter, a boost converter, or a buck-boost converter. A buck converter down-converts an input voltage to a lower output voltage. The power switches operating in a buck converter configuration alternately connect the input voltage to and disconnect the input voltage from the input of the LC filter. A boost converter, on the other hand, up-converts an input voltage to a higher output voltage. In the boost converter configuration, the input voltage is continuously connected to the input of the LC filter, but the inductor of the LC filter is alternately connected to and disconnected from the load where the regulated output voltage is applied. A buck-boost converter switches between the buck-converter configuration and the boost converter configuration.

During the alternate coupling performed in both the buck and boost configurations, the power switches can be exposed to large voltage spikes. These large voltage spikes can create over-voltage stress on the power switches, resulting in breakdown or reliability problems. In general, the voltage spikes are caused by parasitic inductances associated with the power lines that are coupled to and from the LC filter by the power switches.

For example, when the input of an LC filter is suddenly coupled to the input voltage in the buck converter configuration, the source providing the input voltage attempts to rapidly increase the current through the power line coupling the source and the LC filter. However, parasitic inductance associated with the power line acts to oppose any change in current by initially lowering and then oscillating the voltage, provided across the line, above and below the input voltage. Although this oscillation eventually dies down, the higher voltages caused by the oscillations, as noted above, can result in breakdown or reliability problems of the power devices.

Therefore, what is needed is a system and method for reducing voltage spikes across power devices used in voltage regulators.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. EXEMPLARY OPERATING ENVIRONMENT

Figure 1:
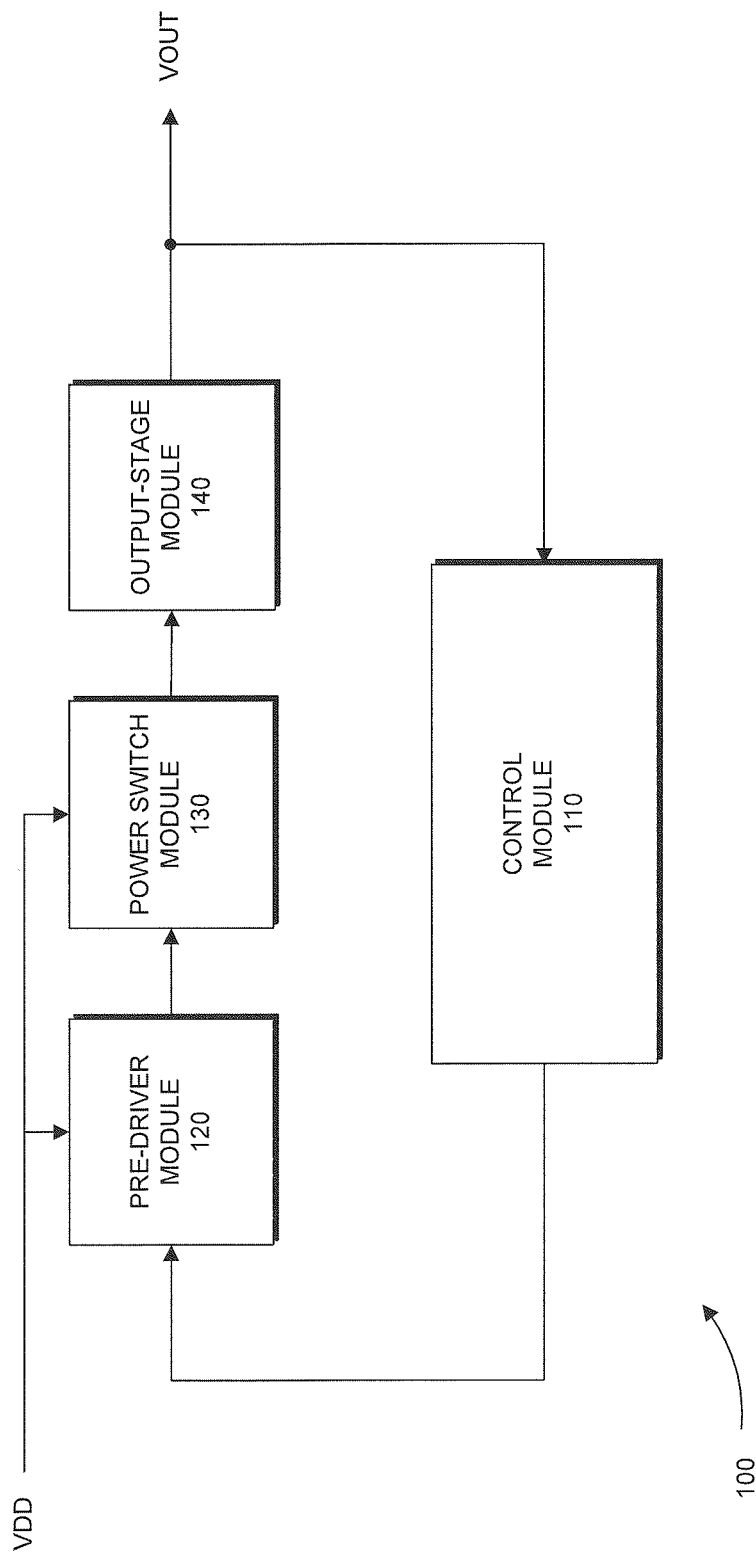
FIG. 1 illustrates an exemplary block diagram of a switching regulator, according to embodiments of the present invention.

FIG. 1 illustrates a block diagram of a switching regulator 100, according to embodiments of the present invention. Switching regulator 100 can be any one of a buck, boost, or buck-boost switching regulator and can be used within non-portable and portable devices, including mobile phones, PDAs, laptops, and cameras, for example, to regulate the flow of power to the load of these devices.

Switching regulator 100 includes a control module 110, a pre-driver module 120, a power switch module 130, and an output-stage module 140. In operation, switching regulator 100 is configured to receive an unregulated input voltage VDD that can vary over a wide range and process the unregulated input voltage VDD to provide a regulated output voltage VOUT.

At a high-level, pre-driver module 120 receives one or more control signals from control module 110. The control signals control the configuration and timing of the power switches included within power switch module 130 to regulate the flow of power from the source providing unregulated input voltage VDD to output-stage module 140. Control module 110 can provide the control signals based on, for example, feedback from the output voltage VOUT to maintain VOUT at a desired level.

Pre-driver module 120 drives power switches within power switch module 130 with a sufficient strength to turn the power switches on and off as directed by the control signals. Output-stage module 140 includes a filter, such as an LC filter, that converts switched current pulses, produced by power switch module 130, into a steady current and regulated output voltage VOUT.

Figure 2:
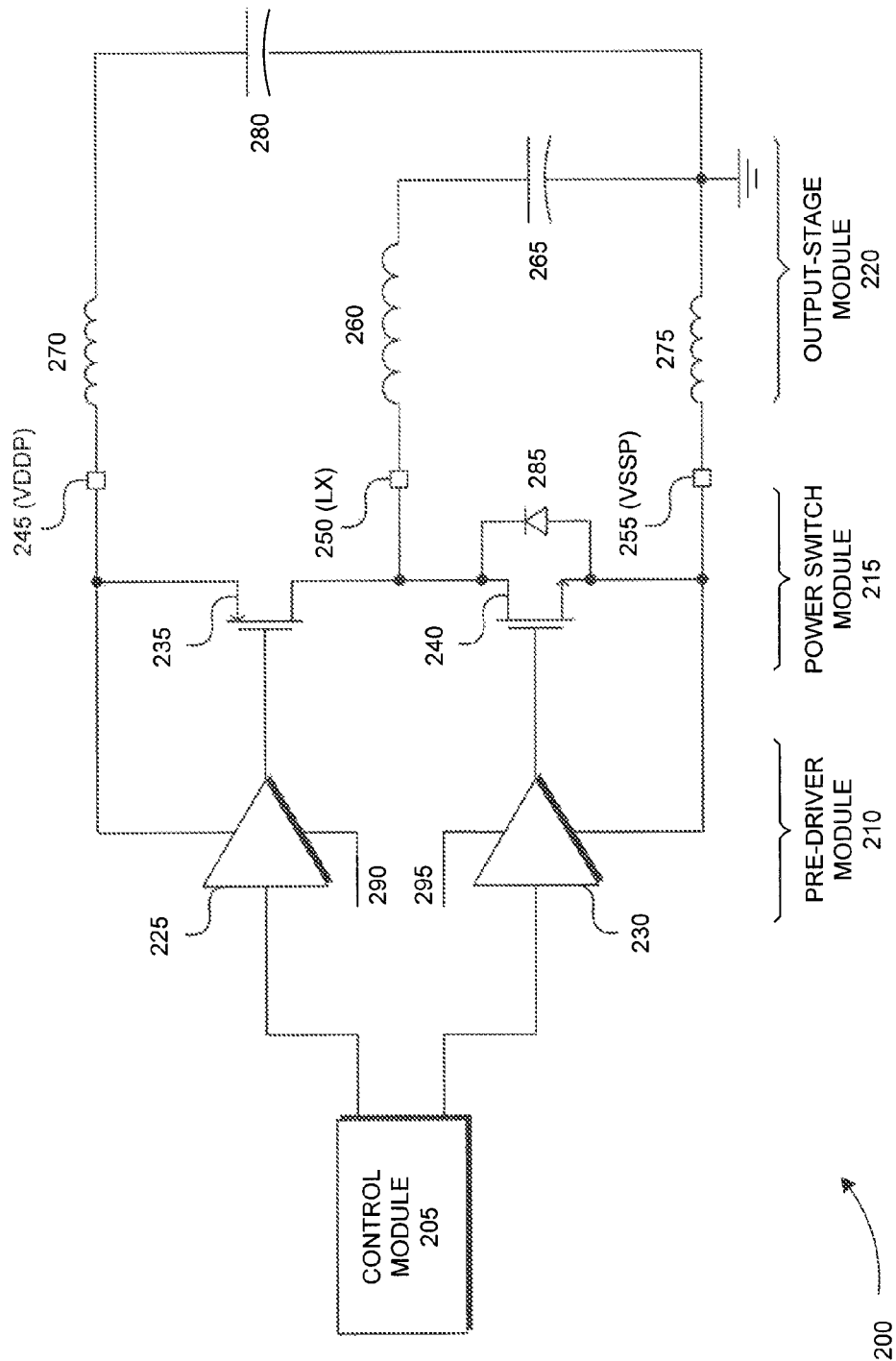
FIG. 2 illustrates a circuit diagram of a conventional buck switching regulator.

In general, switching regulator 100 illustrates one exemplary operating environment for implementing features of the present invention, as well as for highlighting issues with conventional implementations of the modules included within switching regulator 100. Switching regulator 100 is not intended to be limiting. Other equivalent implementations and/or variations of switching regulator 100 are possible as would be understood by a person skilled in the art based on the teachings herein. FIG. 2, described below, highlights a few issues with conventional implementations of the pre-driver module and power switch module within the basic switching regulator configuration of FIG. 1.

2. CONVENTIONAL IMPLEMENTATION

FIG. 2 specifically illustrates a circuit diagram of a conventional buck switching regulator 200. Buck switching regulator 200 has the same basic structure as switching regulator 100 illustrated in FIG. 1 and includes a control module 205, a pre-driver module 210, a power switch module 215, and an output-stage module 220.

Pre-driver module 210 includes pre-drivers 225 and 230 that receive control signals from control module 205 and drive two power switches included within power switch module 215 based on the control signals. Specifically, pre-driver 225 drives active power switch 235 and pre-driver 230 drives synchronous power switch 240. The output of each pre-driver 225 and 230 is a logic signal that has sufficient strength to turn-on and off the power switches in a relatively short period of time by quickly charging and discharging their respective gate capacitances.

As illustrated in FIG. 2, active power switch 235 is implemented as a p-type metal oxide semiconductor (PMOS) and synchronous power switch 240 is implemented as an n-type metal oxide semiconductor (NMOS). The source terminal of active power switch 235 is coupled to an unregulated input voltage (not shown) at source node (VDDP node) 245. The source terminal of synchronous power switch 240 is coupled to ground potential at ground node (VSSP node) 255. The drain terminals of power switches 235 and 240 are coupled together at a common node (LX node) 250.

The input of an LC filter, included in output-stage module 220, is further coupled to LX node 250. The LC filter includes inductor 260 and capacitor 265. Although not shown in FIG. 2, the regulated output voltage provided by switching regulator 200 is provided across capacitor 265.

In normal operation of switching regulator 200, power switches 235 and 240 alternately turn-on and off, connecting and disconnecting the unregulated input voltage at VDDP node 245 to the input of the LC filter in output-stage module 220. Specifically, when active power switch 235 is on and synchronous power switch 240 is off, LX node 250 is high or at a positive voltage potential relative to VSSP node 255. Conversely, when active power switch 235 is off and synchronous power switch 240 is on, LX node 250 is low or near ground potential.

The current flowing through inductor 260 during normal operation of buck switching regulator 200 is switched between the two power switches 235 and 240 depending on which power switch is currently on. When active power switch 235 is on and synchronous power switch 240 is off, the current flowing through inductor 260 will come from VDDP node 245 through active power switch 235. When active power switch 235 is off and synchronous power switch 240 is on, the current flowing through inductor 260 will come from VSSP node 255 through synchronous power switch 240.

A general issue with the topology of buck switching regulator 200 illustrated in FIG. 2 is given by the presence of parasitic inductances 270 and 275. These parasitic inductances can be comprised of bonding wires, printed circuit board traces, the equivalent series inductance of decoupling capacitor 280, and vias, for example. When the current flowing through inductor 260 is alternately switched between the two power switches 235 and 240 during normal operation, as described above, the two parasitic inductances 270 and 275 will experience sudden changes in the current flowing through them. In particular, this change in current flowing through parasitic inductances 270 and 275 can be very fast (on the order of nano-seconds) in hard-switched converters, where the power switches are controlled to be either fully on to provide a low resistance current path or fully off to cut the current path.

As is well known, an inductor opposes changes in current by generating a voltage across its terminals proportional to the rate of change of the current flowing through it. This relationship is specifically given by the following equation:

$$v(t) = L \frac{di(t)}{dt} \quad (1)$$

where v(t) is the time-varying voltage across the inductor, i(t) is the time-varying current through the inductor, and L is the inductance of the inductor. From equation (1), it follows that a sudden change in current through parasitic inductances 270 and 275 will result in a voltage spike developed across the inductors. This voltage spike will be superimposed on top of the existing dc supply voltage. As a result, in the setting of switching regulator 200, the voltage spike can result in overvoltage stress on the devices used to implement power switches 235 and 240 and, in general, anything else that is connected at the pin where the voltage spike occurs ESD circuits, predrivers, etc.). This overvoltage stress can result in reliability problems or even complete breakdown of power switches 235 and 240.

Figure 3:
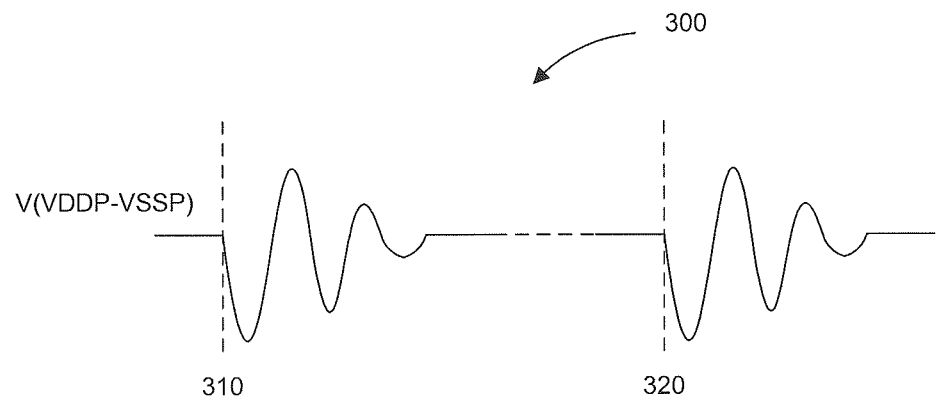
FIG. 3 illustrates a waveform diagram of a voltage spike due to a parasitic inductance associated with a power line coupled to an unregulated input voltage.

FIG. 3 illustrates a waveform diagram 300 of two exemplary voltage spikes due to parasitic inductance 270. More specifically, waveform diagram 300 illustrates the voltage on VDDP node 245 relative to VSSP node 255 right after active power switch 235 is turned-on and synchronous power switch 240 is turned-off at time 310, and the voltage on VDDP node 245 relative to VSSP node 255 right after active power switch 235 is turned-off and synchronous power switch 240 is turned-on at time 320.

When active power switch 235 is turned-on and synchronous power switch 240 is turned-off at time 310, inductor 260 is suddenly coupled to the unregulated input voltage at VDDP node 245 and the source providing the unregulated input voltage attempts to rapidly increase the current through the power line coupling the source and inductor 260. However, parasitic inductance 270 acts to oppose the change in current by initially lowering and then oscillating the voltage provided across the line, as illustrated in waveform 300 of FIG. 3, above and below the unregulated input voltage. Although this oscillation eventually dies down, the higher voltages caused by the oscillation, as noted above, can result in breakdown or reliability problems of synchronous power switch 240 and, in general, anything else that is connected at the pin where the voltage spike occurs (e.g., ESD circuits, prodrivers, etc.). A similar oscillation occurs when active power switch 235 is turned-off and synchronous power switch 240 is turned-on at time 320.

Figure 4:
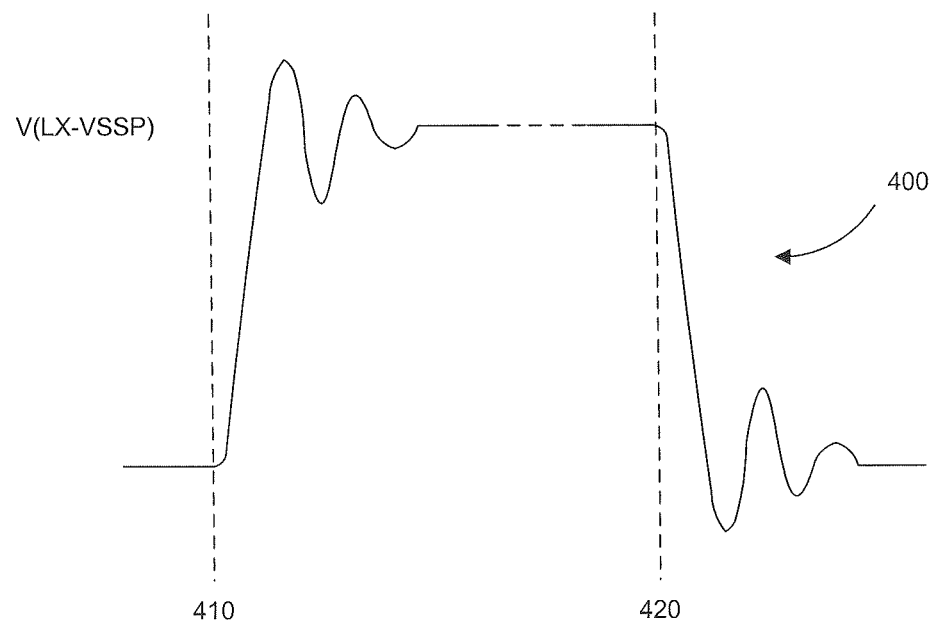
FIG. 4 illustrates a waveform diagram of a voltage spike due to a parasitic inductance associated with a power line coupled to ground potential, according to embodiments of the present invention.

FIG. 4 illustrates a waveform diagram 400 of a voltage spike due to parasitic inductances 270 and 275. More specifically, waveform diagram 400 illustrates the voltage on LX node 250 relative to VSSP node 255 right after active power switch 235 is turned-on and synchronous power switch 240 is turned-off at time 410 and then, after some period of time, the voltage on LX node 250 relative to VSSP node 255 right after active power switch 235 is turned-off and synchronous power switch 240 is turned-on at time 420. The oscillations illustrated in waveform diagram 400, caused by parasitic inductances 270 and 275, can similarly result in breakdown or reliability problems of both active power switch 235 and synchronous power switch 240.

Referring back to FIG. 2, compounding this overvoltage problem is diode 285. Typical switching regulators, such as buck switching regulator 200, have a diode in parallel with the synchronous power switch, such as synchronous power switch 240. Diode 285 can be comprised of, for example, the body diode of synchronous power switch 240, ESD diode(s), and any diodes used external to switching regulator 200 in an integrated circuit implementation.

In general, switching regulators require a short time when both the active and synchronous power switches are off before either turns on in order to avoid cross conduction between the power switches. This time is typically referred to as the non-overlap time or dead time. During the dead time, the current through inductor 260 will flow through diode 285. Thus, diode 285 will be forward biased and conducting the current flowing through inductor 260 before active power switch 235 turns on, for example. As a result, diode 285 will accumulate charge in its junction such that, when active power switch 235 turns on, the charge accumulated in the junction of diode 285 will add to the drain current of active power switch 235. This additional current can create faster changes in the current flowing through parasitic inductance 270 when active power switch 235 turns on, leading to even larger voltages spikes.

One conventional method for reducing the extent of the voltage spikes across parasitic inductances 270 and 275 includes careful design and layout of switching regulator circuit 200 to remove any stray or unnecessary inductances. However, this approach often cannot reduce parasitic inductances 270 and 275 below a certain level or what is otherwise required.

Another conventional approach for reducing the extent of voltage spikes across parasitic inductances 270 and 275 includes reducing the speed at which the current through parasitic inductances 270 and 275 changes when power switches 235 and 240 are switched. This is achieved by having a slow ramp-up or ramp down of the gate-to-source voltage of power switches 235 and 240, which in turn reduces the speed at which the drain current of the power switches changes over time.

More specifically, while on, power switches 235 and 240 are operated in the linear or triode region of operation to limit their respective on resistance and improve the overall efficiency of buck switching regulator 200. The drain current of MOS based power switches operating in the linear region of operation is approximately given by the following equation:

$$Id \approx \mu_n C_{ox} \frac{W}{L}(Vgs - Vt)Vds \qquad (2)$$

where Id is the drain current, $\mu_n$ is the effective charge-carrier mobility, $C_{ox}$ is the gate oxide capacitance per unit area, W is the gate width, L is the gate length, Vgs is the gate-to-source voltage, Vt is the threshold voltage, and Vds is the drain-to-source voltage.

The problem with the conventional approach of reducing the speed at which the current through parasitic inductances 270 and 275 changes by slowly ramping-up or ramping down the gate-to-source voltage Vgs of power switches 235 and 240 is that, even with the slow change in the gate-to-source voltage Vgs, the drain current Id of power switches 235 and 240 can vary fast. This is because of the typically large width-to-length ratio (i.e., W/L) of the channels associated with power switches 235 and 240. Having a large width-to-length ratio lowers the resistance of these devices while on and improves the efficiency of the switching regulator. However, as can be seen from equation (2), the larger the width-to-length ratio, the faster the drain current Id of power switches 235 and 240 varies for an incremental increase or decrease in their respective gate-to-source voltage Vgs values. Although the width-to-length ratio of the channels associated with power switches 235 and 240 can be reduced, such a reduction will in turn reduce the efficiency of the switching regulator.

In addition to the above mentioned issues with the conventional approach of reducing the speed at which the current through parasitic inductances 270 and 275 changes, is that the strengths of pre-drivers 225 and 230 have to be very weak in order to turn-on power-switches 235 and 240 slowly (i.e., to slowly ramp-up and ramp-down the gate-to-source voltage Vgs of power switches 235 and 240). Such weak pre-drivers, however, may not be able to keep power switches 235 and 240 fully on in the event of sudden variations in drain voltage due to the well known Miller effect.

As will be explained below, embodiments of the present invention provide a new system and method for significantly reducing voltage spikes across parasitic inductances within switching regulators, such as buck switching regulator 200 illustrated in FIG. 2. The embodiments of the present invention avoid the drawbacks of the conventional solutions described above, including efficiency degradation, higher cost, and problems associated with weak pre-drivers.

3. PARALLEL ACTIVE SWITCH TOPOLOGY

Embodiments of the present invention use two or more active power switches in parallel within a switching regulator instead of only one active power switch, as found in conventional implementations. In addition, embodiments of the present invention successively turn-on and -off the two or more active power switches in a manner that reduces parasitic voltage spikes but does not degrade the efficiency or other parameters associated with the switching regulator. Embodiments of the present invention apply to many switching regulators (e.g., buck, boost, or buck-boost) and, in particular, to hard-switched switching regulators that include active power switches integrated on chip.

Figure 5:
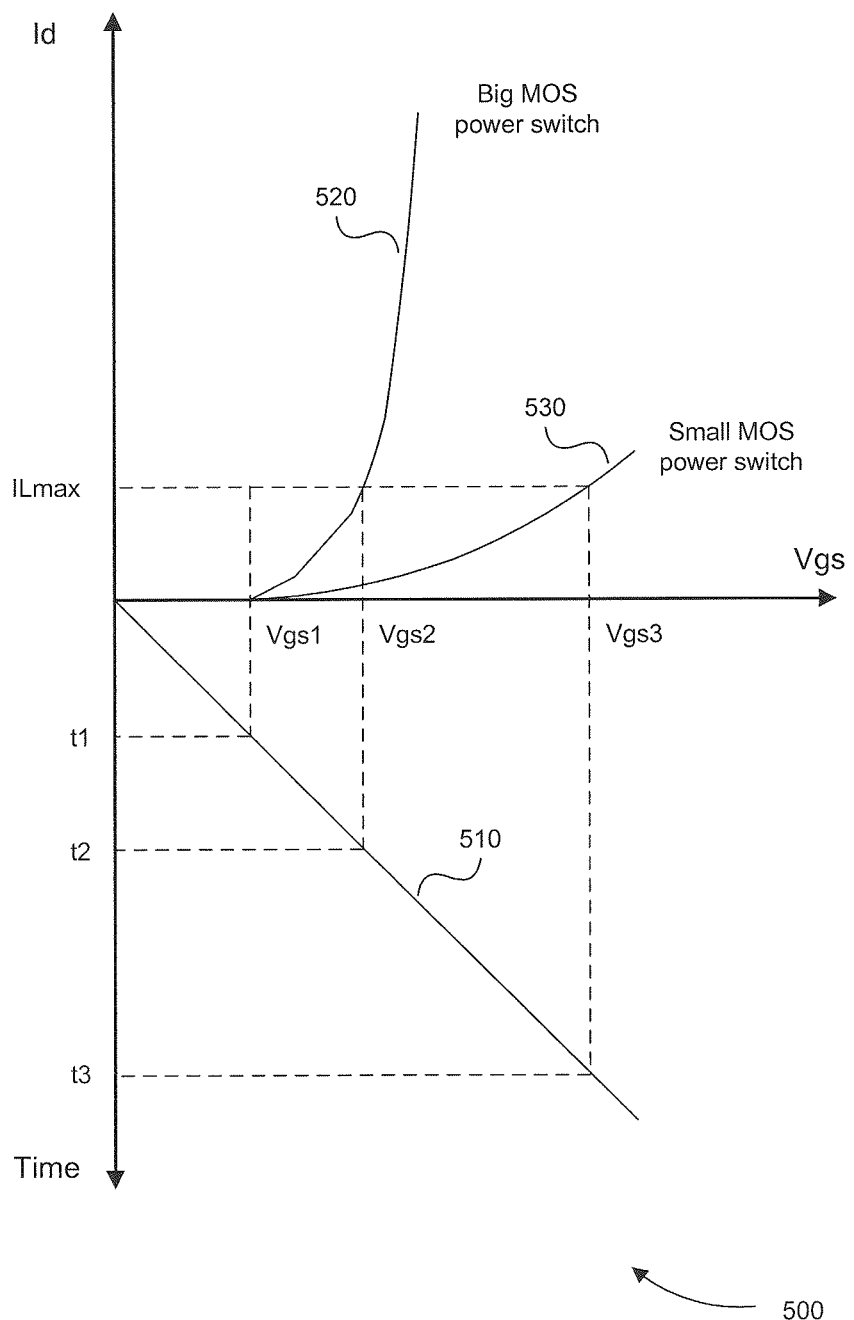
FIG. 5 illustrates a plot of drain current versus gate voltage, as well as gate voltage versus time, for both a big and small active power switch, according to embodiments of the present invention.

Embodiments of the present invention will now be described with reference to FIG. 5. FIG. 5 illustrates a plot 500 of gate-to-source voltage Vgs versus drain current Id in the upper quadrant, as well as gate-to-source voltage Vgs versus time in the lower quadrant, for both a big and small active power switch implemented using MOS transistors, according to embodiments of the present invention. The big power switch is considered "bigger" than the small active power switch because the big power switch has a larger width-to-length ratio (i.e., W/L) associated with its channel than the small power switch.

The single plot line 510 in the lower quadrant of plot 500 illustrates the gate-to-source voltage Vgs versus time for both the big and small active power switches. The gate-to-source voltage Vgs for both the big and small active power switches is therefore varied identically over time. This identical variation over time of the gate-to-source voltage Vgs for both the big and small active power switches helps to illustrate the difference in gate-to-source voltage Vgs versus drain current Id for the big and small active power switches in the upper quadrant of plot 500, as will be explained below.

In the upper quadrant of plot 500, plot line 520 illustrates the drain current Id versus gate-to-source voltage Vgs for the big active power switch and plot line 530 in the upper quadrant of plot 500 illustrates the drain current Id versus gate-to-source voltage Vgs for the small active power switch.

The value Vgs1 denoted on the horizontal axis of plot 500 represents the gate-to-source voltage Vgs at which both the big and small active power switches begin to conduct and have drain current. In other words, Vgs1 represents the threshold voltage Vth of both the big and small active power switches, which are substantially equal in the embodiment of FIG. 5. The value ILmax denoted on the vertical axis of plot 500 in the upper quadrant represents the maximum drain current Id that both the big and small active power switches can provide while operating in their linear regions.

As can be seen from plot lines 520 and 530, the drain current Id of the big active power switch will increase much faster for the same increase in gate-to-source voltage Vgs as the small active power switch because the big active power switch has a larger width-to-length ratio than the small active power switch. The big active power switch, as a result, will reach the maximum inductor current ILmax in a shorter amount of time and for a significantly smaller gate-to-source voltage Vgs. As specifically illustrated in plot 500, the big active power switch reaches ILmax for a gate-to-source voltage of Vgs2 and a time of t2, whereas the small active power switch reaches ILmax for a gate-to-source voltage of Vgs3 and a time t3.

Accordingly, it can be seen that the change in drain current Id versus time for the small active power switch is significantly smaller than the big active power switch for the same rate of change in gate-to-source voltage Vgs. Thus, using the small active power switch together with a pre-driver configured to slowly ramp-up and -down its gate-to-source voltage, as opposed to using the big active power switch, can reduce the magnitude of voltage spikes generated in a switching regulator by parasitic inductances. However, there is still a need for a big active power switch in order to provide a small on resistance and good efficiency.

Embodiments of the present invention include the use of a small active power switch in parallel with a big active power switch, such as the big and small active power switches described above in regard to FIG. 5. The minimum configuration of this parallel active power switch topology is illustrated in FIG. 6 and described further below.

Figure 6:
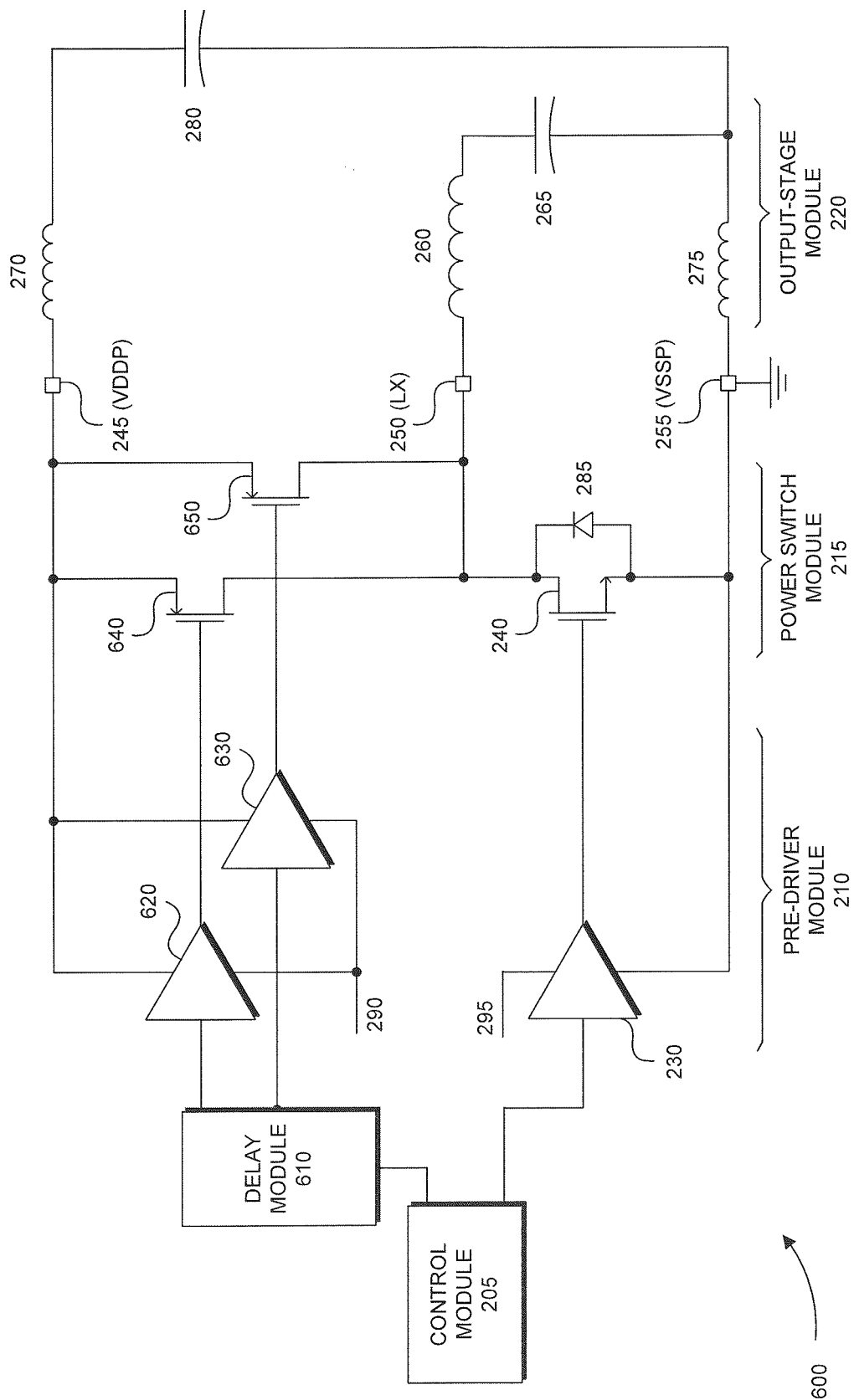
FIG. 6 illustrates a circuit diagram of a buck switching regulator with multiple active power switches, according to embodiments of the present invention.

FIG. 6 specifically illustrates a circuit diagram of a buck switching regulator 600 with two active power switches, according to embodiments of the present invention. Buck switching regulator 600 includes a similar structure as buck switching regulator 200 illustrated in FIG. 2, including a control module 205, a pre-driver module 210, a power switch module 215, and an output-stage 220. However, buck switching regulator 600 includes an additional delay module 610, two active power switches 640 and 650 (as opposed to the single active power switch 235 of buck switching regulator 200), and two pre-drivers 620 and 630 for driving the two active power switches 640 and 650 (as opposed to the single pre-driver 225 for driving the single active power switch 235 of buck switching regulator 200).

As illustrated in the embodiment of FIG. 6, active power switches 640 and 650 are implemented as p-type metal oxide semiconductor (PMOS) devices and synchronous power switch 240 is implemented as an n-type metal oxide semiconductor (NMOS) device. In the embodiment of FIG. 6, active power switch 640 is constructed to have a smaller width-to-length ratio (i.e., W/L) associated with its channel than active power switch 650. Thus, active power switch 640 can be referred to as the small active power switch and active power switch 650 can be referred to as the big active power switch.

As further illustrated in the embodiment of FIG. 6, the source terminal of active power switches 640 and 650 are coupled to an unregulated input voltage (not shown) at source node (VDDP node) 245. The source terminal of synchronous power switch 240 is coupled to ground potential at ground node (VSSP node) 255. The drain terminals of power switches 640, 650, and 240 are coupled together at common node (LX node) 250.

The input of the LC filter, included in output-stage module 220, is further coupled to LX node 250. The LC filter includes inductor 260 and capacitor 265. Although not shown in FIG. 6, the regulated output voltage provided by switching regulator 600 is provided across capacitor 265.

In operation, when the active power switch portion of power switch module 215 is to be turned-on, small active power switch 640 is turned-on first in a controlled manner to achieve a slow change in current versus time through parasitic inductance 270. After a certain delay, big active power switch 650 is turned-on in order to achieve a small on resistance and dissipate less conduction power. In an embodiment, the minimum delay between the time active power switch 640 is turned-on and active power switch 650 is turned-on is given by the time required to remove any charge accumulated in diode 285 or any other charge due to parasitic capacitance at LX node 250.

When the active power switch portion of power switch module 215 is to be turned-off, big active power switch 650 is turned-off first and then small active power switch 640 is turned-off in a controlled manner to achieve a slow change in current versus time through parasitic inductance 270.

In an embodiment, pre-driver 620 is configured to slowly ramp-up and ramp-down the gate-to-source voltage of small active power switch 640 to achieve a slow change in current versus time through parasitic inductance 270, whereas pre-driver 630 is configured to quickly ramp-up and ramp-down the gate-to-source voltage of big active power switch 650.

In an embodiment, delay module 610 is configured to delay the control signal, provided by control module 205, that signals to turn-on and -off the active power switch portion of power switch module 215 to provide the operation described above. More specifically, delay module 610 is configured to provide a first delayed control signal to pre-driver 620 and a second delayed control signal to pre-driver 630 based on the control signal provided by control module 205.

When the active power switch portion of power switch module 215 is to be turned-on as indicated by the control signal provided by control module 205, delay module 610 provides the first and second delayed control signals such that small active power switch 640 is turned-on before big active power switch 650 is turned-on. When the active power switch portion of power switch module 215 is to be turned-off as indicated by the control signal provided by control module 205, delay module 610 provides the first and second delayed control signals such that small active power switch 640 is turned-off before big active power switch 650 is turned-off.

It should be noted that buck switching regulator 600 is provided for the purpose of illustration and not limitation. Other equivalent implementations and/or variations of buck switching regulator 600 are possible as would be understood by a person skilled in the art based on the teachings herein. Equivalent implementations and/or variations may include, for example, variations in transistor type (e.g., PNP, JFET, p-type FETs in place of n-type FETs, etc.), variations in switching regulator type (e.g., boost and buck-boost switching regulators), and variations in the number of active power switches used and associated predrivers used.

Figure 7:
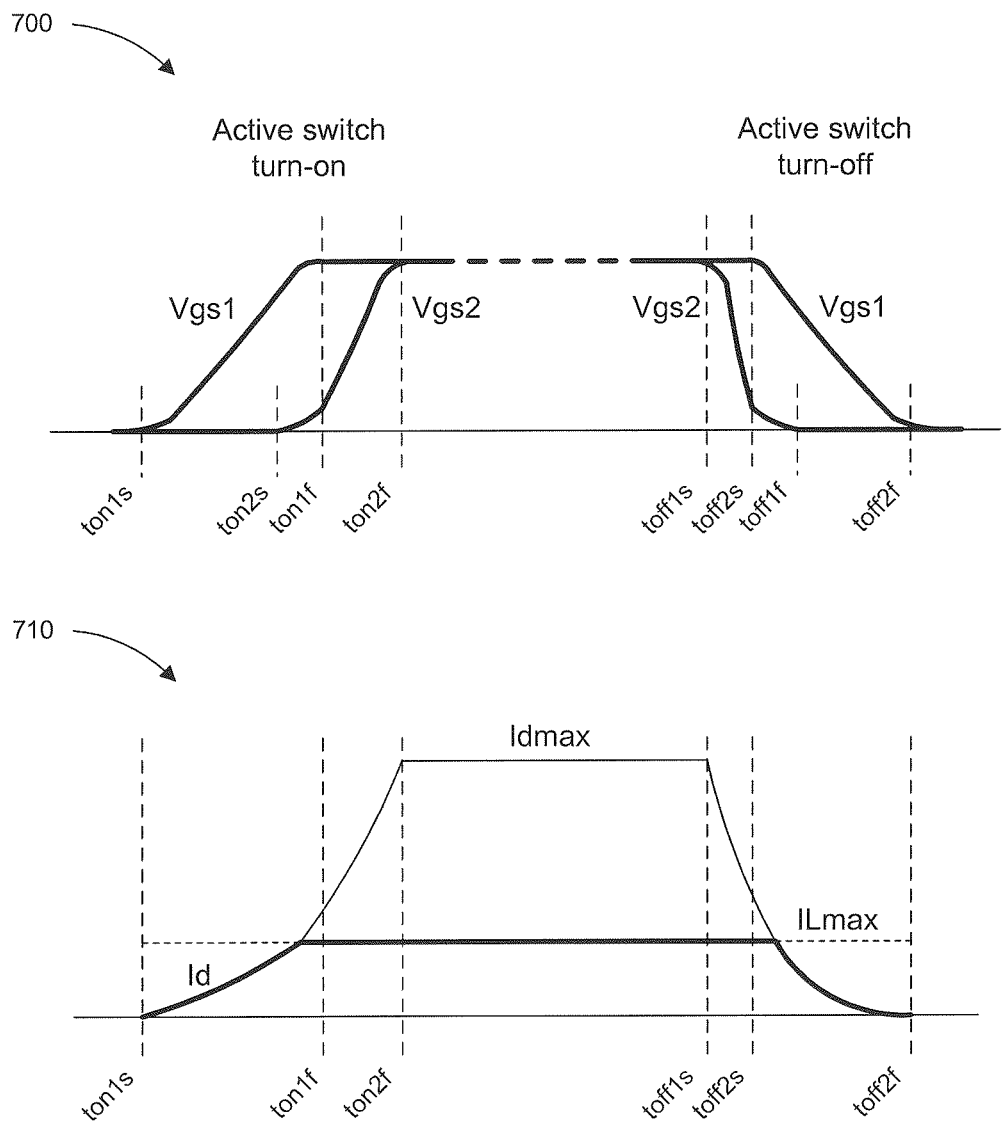
FIG. 7 illustrates a waveform diagram of the turn-on and turn-off sequence of the active power switches illustrated in FIG. 6 and the gate-to-source voltages versus time for the active power switches during the turn-on and turn-off sequence, according to embodiments of the present invention.

FIG. 7 illustrates waveform diagrams 700 and 710 of the turn-on and -off sequence of active power switches 640 and 650 illustrated in FIG. 6, according to embodiments of the present invention.

Waveform 700 specifically illustrates the absolute value of gate-to-source voltage of small active power switch 640 (denoted by line Vgs1) and big active power switch 650 (denoted by line Vgs2) versus time, and waveform 710 illustrates the combined drain current (denoted by line Id) of the big and small active power switches 640 and 650 versus time. As illustrated by waveform 700, during turn-on, the gate-to-source voltage of small active power switch 640 starts to increase at time ton1s. The gate-to-source voltage of small active power switch 640 slowly increases such that the change in its drain current slowly increases from the time it begins to turn on at ton1s till the time it reaches its maximum point of being on at ton1f. Because the drain current of small active power switch 640 slowly increases, any voltage spike produced by parasitic inductance 270 illustrated in FIG. 6 is reduced. As illustrated by waveform 710, the drain current of active power switch 640, at its maximum point of being on at ton1f, is at or slightly greater than the maximum current ILmax flowing through inductor 260.

In an embodiment, the gate-to-source voltage of big active power switch 650 starts to increase at a time ton2s before small active power switch 640 reaches its maximum point of being on at time ton1f. In another embodiment, the gate-to-source voltage of big active power switch 650 starts to increase at a time ton2s such that the gate-to-source voltage of big active power switch 650 exceeds its threshold voltage at substantially the same time small active power switch 640 reaches its maximum point of being on at time ton1f.

Because the combined drain current (denoted by line Id) of the big and small active power switches 640 and 650 does not increase after time ton1f, big active power switch 650 can be turned on much faster than small active power switch 640. In other words, because the combined drain current (denoted by line Id) of the big and small active power switches 640 and 650 does not increase after time ton1f, turning on big active power switch 650 fast does will not lead to increased voltage spikes as a result of parasitic inductance 270 illustrated in FIG. 6.

The delay between the time small active power switch 640 begins to turn on at time ton1s and the time big active power switch 650 begins to turn on at time ton2s is determined by delay module 610 illustrated in FIG. 6. The time its takes from when small active power switch begins to turn on at time ton1s and when it reaches its maximum point of being on at time ton1f is determined by the turn on strength of pre-driver 620 and the size of small active power switch 640. The time its takes from when big active power switch begins to turn on at time ton2s and when it reaches its maximum point of being on at time ton2f is determined by the turn on strength of pre-driver 630 and the size of big active power switch 650.

The turn-off sequence is similar to the turn-on sequence in reverse order. As illustrated by waveform 700, big active power switch 650 begins to turn off first at time toff1s and is completely off at time toff1f. In between those two times, small active power switch 640 begins to turn-off slowly at time toff2s. In an embodiment, small active power switch 640 begins to turn off at or near the moment when the gate-to-source voltage of big active power switch 650 falls below its threshold voltage. In an embodiment, small active power switch 640 can be turned off more quickly than it is turned on because small active power switch 640 only needs to conduct additional current from diode 285 illustrated in FIG. 6 during turn on.

It should be noted that, although two active power switches 640 and 650 are used in the switching regulator configuration of FIG. 6, more active power switches can be used. In particular, if the switching regulator needs to operate with inductor currents that are larger than the maximum drain current that can be provided by small active power switch 640, additionally active power switches, with gradually increasing width-to-length ratios, can be further placed in parallel with active power switches 640 and 650 illustrated in FIG. 6. In an embodiment, each active power switch will be driven by its own pre-driver and will be controlled by a separate control signal provided by delay module 610.

The separate control signals will be provided by delay module 610 such that the active power switches are turned-on, one at a time, from smallest to biggest. The delay between each active power switch being turned-on should be similar to the turn-on delay between small active power switch 640 and 650 described in reference to FIG. 7. In addition, the separate control signals will be provided by delay module 610 such that the active power switches are turned-off, one at a time, from biggest to smallest. The delay between each active power switch being turned-off should be similar to the turn-off delay between small active power switch 640 and big active power switch 650 described in reference to FIG. 7.

4. CONCLUSION

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should by noted that the exemplary process for turning-on and -off the active power switches described herein can be implemented in hardware, software, or any combination thereof. For instance, the exemplary process for turning-on and -off the active power switches described herein can be implemented using computer processors, computer logic, application specific circuits (ASICs), digital signal processors, etc., as will be understood by one of ordinary skill in the arts based on the discussion herein.

Moreover, the exemplary process for turning-on and -off the active power switches can be embodied by a computer processor or any one of the hardware devices listed above. The computer program instructions cause the processor to perform the signal processing functions described herein. The computer program instructions (e.g., software) can be stored in a computer useable medium, computer program medium, or any storage medium that can be accessed by a computer or processor. Such media include a memory device such as a computer disk or CD ROM, or the equivalent. Accordingly, any computer storage medium having computer program code that causes a processor to perform the signal processing functions described herein are with the scope and spirit of the present invention.

The breadth and scope of the present invention should not be limited by any of the above-described exemplary embodiments, but should be defined only in accordance with the following claims and their equivalents.

What is claimed is:

1. A switching regulator for providing a regulated output voltage from an unregulated input voltage, the switching regulator comprising:

a control module configured to provide a control signal based on a desired regulated output voltage;
   a delay module configured to delay the control signal to provide a first delayed control signal and a second delayed control signal;
   a pre-driver module configured to provide a first drive signal based on the first delayed control signal and a second drive signal based on the second delayed control signal; and
   a power switch module comprising first and second active power switches coupled in parallel and configured to switchably couple the unregulated input voltage to an output stage based on the first and second drive signals, respectively,
   wherein a width-to-length ratio of a channel associated with the first active power switch is less than a width-to-length ratio of a channel associated with the second active power switch.

2. The switching regulator of claim 1, wherein the delay module is configured to provide the first delayed control signal and the second delayed control signal such that the first delayed control signal turns on the first active power switch before the second delayed control signal turns on the second active power switch.

3. The switching regulator of claim 1, wherein the delay module is configured to provide the first delayed control signal and the second delayed control signal such that the first active power switch turns on before the second active power switch by an amount of time required to remove charge accumulated in a diode coupled in parallel with a synchronous power switch included in the power switch module.

4. The switching regulator of claim 1, wherein the delay module is configured to provide the first delayed control signal and the second delayed control signal such that the first delayed control signal turns off the first active power switch after the second delayed control signal turns off the second active power switch.

5. The switching regulator of claim 1, wherein the pre-driver module comprises a first pre-driver configured to provide the first drive signal based on the first delayed control signal, and a second pre-driver configured to provide the second drive signal based on the second delayed control signal.

6. The switching regulator of claim 5, wherein the first pre-driver and the second pre-driver are configured to provide the first and second drive signals with different levels of strength.

7. The switching regulator of claim 1, wherein the output stage comprises an inductor and a capacitor.

8. The switching regulator of claim 7, wherein the first active power switch is configured to provide a drain current that is larger than the maximum operating current flowing through the inductor.

9. The switching regulator of claim 7, wherein the regulated output voltage is provided across the capacitor of the output stage.

10. The switching regulator of claim 9, wherein the control module provides the control signal based on the desired regulated output voltage and a current voltage value of the regulated output voltage provided across the capacitor of the output stage.

11. The switching regulator of claim 1, wherein the control module provides the control signal to at least step-up or step-down the unregulated input voltage.

12. The switching regulator of claim 1, wherein the switching regulator is at least one of a buck, boost, and buck-boost switching regulator.

13. The switching regulator of claim 1, wherein the first active power switch and the second active power switch are metal oxide semiconductor (MOS) devices.

14. A method for controlling a switching regulator to provide a regulated output voltage from an unregulated input voltage, the method comprising:
   generating a control signal based on a desired regulated output voltage;
   delaying the control signal to provide first and second delayed control signals;
   generating first and second drive signals based on the first and second delayed control signals, respectively;
   switchably coupling the unregulated input voltage to an output stage using a first active power switch based on the first drive signal; and
   switchably coupling the unregulated input voltage to the output stage using a second active power switch based on the second drive signal,
   wherein a width-to-length ratio of a channel associated with the first active power switch is less than a width-to-length ratio of a channel associated with the second active power switch.

15. The method of claim 14, wherein the delaying the control signal to provide the first and second delayed control signals further comprises:
   providing the first delayed control signal and the second delayed control signal such that the first delayed control signal turns on the first active power switch before the second delayed control signal turns on the second active power switch.

16. The method of claim 14, wherein the delaying the control signal to provide the first and second delayed control signals further comprises:
   providing the first delayed control signal and the second delayed control signal such that the first active power switch turns on before the second active power switch by an amount of time required to remove charge accumulated in a diode coupled in parallel with a synchronous power switch included in the power switch module.

17. The method of claim 14, wherein the delaying the control signal to provide the first and second delayed control signals further comprises:
   providing the first delayed control signal and the second delayed control signal such that the first delayed control signal turns off the first active power switch after the second delayed control signal turns off the second active power switch.

18. The method of claim 14, wherein the first active power switch and the second active power switch are metal oxide semiconductor (MOS) devices.

* * * * *